United States Patent
Paek et al.

(10) Patent No.: US 7,752,152 B2
(45) Date of Patent: Jul. 6, 2010

(54) USING PREDICTIVE USER MODELS FOR LANGUAGE MODELING ON A PERSONAL DEVICE WITH USER BEHAVIOR MODELS BASED ON STATISTICAL MODELING

(75) Inventors: Timothy S. Paek, Sammamish, WA (US); David M. Chickering, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 365 days.

(21) Appl. No.: 11/378,024

(22) Filed: Mar. 17, 2006

(65) Prior Publication Data

US 2007/0239637 A1    Oct. 11, 2007

(51) Int. Cl.
- G06F 15/18 (2006.01)
- G06E 1/00 (2006.01)
- G06E 3/00 (2006.01)
- G06G 7/00 (2006.01)

(52) U.S. Cl. ..................................................... 706/20

(58) Field of Classification Search .................... 706/20
See application file for complete search history.

(56) References Cited

U.S. PATENT DOCUMENTS

| | | | |
|---|---|---|---|
| 4,713,778 A | 12/1987 | Baker | |
| 4,748,670 A | 5/1988 | Bahl et al. | |
| 5,005,203 A | 4/1991 | Ney | |
| 6,044,347 A | 3/2000 | Abella et al. | |
| 6,233,570 B1 | 5/2001 | Horvitz et al. | |
| 6,262,730 B1 * | 7/2001 | Horvitz et al. | 715/707 |
| 6,301,560 B1 | 10/2001 | Masters | |
| 6,434,523 B1 | 8/2002 | Monaco | |
| 6,694,296 B1 | 2/2004 | Alleva et al. | |

(Continued)

FOREIGN PATENT DOCUMENTS

EP    0899737(A2)    3/1999

(Continued)

OTHER PUBLICATIONS

Paek, T. and Horvitz, E. "Optimizing automated call routing by integrating spoken dialog models with queuing models," Proc. of HLT-NAACL, 2004, pp. 41-48.*

(Continued)

*Primary Examiner*—Donald Sparks
*Assistant Examiner*—Li-Wu Chang
(74) *Attorney, Agent, or Firm*—Lee & Hayes, PLLC

(57) ABSTRACT

A system and method for prediction of a user goal for command/control of a personal device (e.g., mobile phone) is provided. The system employs statistical model(s) that can predict a command based, at least in part, on past user behavior (e.g., probability distribution over a set of predicates, and, optionally arguments). Further, the system can be employed with a speech recognition component to facilitate language modeling for predicting the user goal.

The system can include predictive user models (e.g., predicate model and argument model) that receive a user input (e.g., utterance) and employ statistical modeling to determine the likely command without regard to the actual content of the input (e.g., utterance). The system employs features for predicting the next user goal which can be stored in a user data store. Features can capture personal idiosyncrasies or systematic patterns of usage (e.g., device-related, time-related, predicate-related, contact-specific and/or periodic features).

20 Claims, 12 Drawing Sheets

U.S. PATENT DOCUMENTS

| | | | |
|---|---|---|---|
| 6,836,760 | B1 | 12/2004 | Bellegarda et al. |
| 6,839,680 | B1* | 1/2005 | Liu et al. ................... 705/10 |
| 6,957,184 | B2 | 10/2005 | Schmid et al. |
| 6,993,586 | B2* | 1/2006 | Chen et al. ................ 709/228 |
| 7,031,908 | B1 | 4/2006 | Huang et al. |
| 7,200,559 | B2 | 4/2007 | Wang |
| 7,203,909 | B1* | 4/2007 | Horvitz et al. ............. 715/765 |
| 7,389,234 | B2 | 6/2008 | Schmid et al. |
| 2001/0016814 | A1 | 8/2001 | Hauenstein |
| 2001/0047265 | A1 | 11/2001 | Sepe, Jr. |
| 2002/0013706 | A1 | 1/2002 | Profio |
| 2002/0123876 | A1 | 9/2002 | Pokhariyal et al. |
| 2002/0152071 | A1 | 10/2002 | Chaiken et al. |
| 2003/0009335 | A1 | 1/2003 | Schalkwyk et al. |
| 2003/0195739 | A1 | 10/2003 | Washio |
| 2004/0023656 | A1* | 2/2004 | Purdy et al. ................ 455/445 |
| 2004/0254957 | A1* | 12/2004 | Hyotyniemi et al. ..... 707/104.1 |
| 2004/0267518 | A1 | 12/2004 | Kashima et al. |
| 2005/0038650 | A1 | 2/2005 | Bellegarda et al. |
| 2005/0154580 | A1 | 7/2005 | Horowitz et al. |
| 2006/0009973 | A1 | 1/2006 | Nguyen et al. |
| 2006/0129396 | A1 | 6/2006 | Ju et al. |
| 2006/0129397 | A1 | 6/2006 | Li et al. |
| 2006/0173686 | A1 | 8/2006 | Hwang |
| 2006/0190253 | A1* | 8/2006 | Hakkani-Tur et al. ....... 704/243 |
| 2006/0277031 | A1 | 12/2006 | Ramsey |

FOREIGN PATENT DOCUMENTS

| | | |
|---|---|---|
| GB | 2390930(A) | 1/2004 |

OTHER PUBLICATIONS

Billsus, D. and Pazzani, M. "A personal news agent that talks, learns and explains", Proc. of the 3rd annual conference on Autonomous Agents, 1999, pp. 268-275.*

Paek, T. and Horvitz, E. "Conversation as Action Under Uncertainty", Proc. of the 16th Conference on Uncertainty in Artificial Intelligence, 2000.*

Paek et al. "Conversation as Action Under Uncertainty", Proc. of the 16th Conference on Uncertainty in Artificial Intelligence, 2000.*

Thompson, et al. "A Personalized System for Conversational Recommendations", Journal of Arti_cial Intelligence Research 21 (2004) 393-428.*

Han, et al. "Synthetic Character with Bayesian Network and Behavior Network for Intelligent Smartphone", KES (1) 2005: 737-743.*

Horvitz, et al. "In pursuit of effective handsfree decision support: coupling Bayesian inference, speech understanding, and user models. In: Nineteenth Anuual Symposium on Computer Applications in Medical Care. Toward Cost-Effective Clinical Computing", http://change2.it.jcu.edu.au/~phillip/sit/honours/effective-handsfree.pdf, 1995.*

PAek, et al. "Conversation as Action Under Uncertainty", UAI, 2000.*

U.S. Appl. No. 11/170,998, filed Jun. 29, 2005, Paek, et al.

U.S. Appl. No. 10/718,138, filed Nov. 20, 2003, Wang.

U.S. Appl. No. 09/585,834, filed Jun. 1, 2000, Huang.

U.S. Appl. No. 10/447,399, filed May 29, 2003, Wang.

Chickering. "A Bayesian approach to learning Bayesian networks with local structure." (1997) Proceedings of the 13th Conference on Uncertainty in Artifical intelligence, pp. 80-89.

"Speech Recognition grammar specification version 1.0." http://www.w3.org/TR/speech-grammar/ last viewed Mar. 17, 2006, 88 pages.

Horvitz, et al. "Harnessing Models of Users' Goals to Mediate Clarification Dialog in Spoken Language Systems." (2001) 11 pages.

Horvitz, et al. "In pursuit of effective hansdfree decision support: coupling Bayesian interface, speech understanding, and user models" (1995) pp. 3-13.

Johansson. "User Modeling in dialog systems" (2002) Technical Report SAR 02-2, Santa Anna IT Research, 24 pages.

Oviatt. "Predicting hyperarticulate speech during human-computer error resolution" (1998) Speech Communication, pp. 87-110.

Paek, et al. "Conversation as action uncertainty" (2000) Proceedings of the 16th Conference on Uncertainty in Artifical Intelligence, pp. 455-464.

Roseenfeld. "Two decades of statistical language modeling: where do we go from here?" (2000) Proceedings of the IEEE, 11 pages.

Rosenfeld. "Universal speech interfaces" (2001) Interactions, pp. 34-44.

Webb, et al. "Machine Laerning for User Modeling" (2001) User Modeling and User-Adapted Interaction, pp. 19-29.

Widmer, et al. "Learning in the presence of concept drift and hidden contexts" (1996) Machine Learning, pp. 69-101.

Chickering. Technical Report MSR-TR-2002-103. (2002) 3 pages.

Wang, et al. "Improved Name Recognition with User Modeling" Proceedings of the Eurospeech Conference (2003) 4 pages.

Fonix-Freedom of Speech. "About Fonix VoiceDial" http://www.fonixspeech.com/pages/voicedial.php last viewed Mar. 17, 2006, 1 page.

Fonix- Freedom of Speech. "About Fonix VoiceDial 2.1" http://www.fonixspeech.com/pages/voicedial2_1.php last viewed Mar. 17, 2006, 1 page.

Fonix- Freedom of Speech. "About Fonix VoiceCentral" http://www.fonixspeech.com/pages/voicecentral.php last viewed Mar. 17, 2006, 1 page.

Jelinek. "Statistical Methods for Speech Recognition" MIT Press Cambridge, MA (1997).

Woods. "Language Processing for Speech Understanding" Computer Speech Processing. Prentice-Hall International (1983) pp. 304-334.

Akiba et al., "Selective Back-Off Smoothing for Incorporating Grammatical Constraints into the N-Gram Language Model", Proceedings of the International Conference on Spoken Language Processing, Sep. 2002, vol. 2, pp#881-pp#884.

Balakrishna et al., "Automatic Creation and Tuning of Context Free Grammars for Interactive Voice Response Systems", Proceeding of NLP - KE'05, IEEE Sep. 2005, 158-163.

Bell et al., "Real-time Handling of Fragmented Utterances", in the Proceedings of NAACL 2001, pp#1-pp#7.

Dusan et al., "Adaptive Dialog Based upon Multimodal Language Acquistion", Proceedings of the Fourth IEEE International Conference on Multimodal Interfaces, 2002, 6 pages.

Gorrell, "Using Statistical Language Modelling to Identify New Vocabulary in a Grammar-Based Speech Recognition System", Proceedings of the 8th Curopean Conference on Speech Communication and Technology (Eurospeech), 2003, pp#2729-pp#2732.

Hockey et al., "Targeted Help for Spoken Dialogue Systems: Interlligent feedback improves naive users' performance", Proceedings of the EACL, 2003, pp#147-pp#154.

Knight et al., "Comparing grammar-based and robust approaches to speech understanding: a case study", Eurospeech 2001-Scandinavia, pp#1-pp#4.

OA Dated Nov. 28, 2008 for U.S. Appl. No. 11/278,893, 34 pages.

Souvignier, et al., "The Thoughtful Elephant: Strategies for Spoken Dialog Systems", IEEE Trans. on speech and audio processing, 2000. 12 pages.

Wang et al., "Spoken Language Understanding", IEEE Signal Processing Magazine, Sep. 2005, pp#16-pp#31.

Webb et al., "Data-Driven Language Understanding for Spoken Language Dialogue", in Proceedings of the AAAI Workshop on Spoken Language Understanding, 2005, Pittsburgh, 7 pages.

\* cited by examiner

| Predicate | Category | Example |
|---|---|---|
| 1. Launch | APPLICATION | "Start Pocket Word." |
| 2. Reminders | CALENDAR | "Reminders off." |
| 3. Appointment | CALENDAR | "What's my next meeting?" |
| 4. General | MEDIA | "What song is this?" "Next track." |
| 5. Play | MEDIA | "Play jazz." "Play Missa Solemnis." |
| 6. Shuffle | MEDIA | "Turn shuffle on." |
| 7. Call | PHONE | "Call Max at home." "Redial" |
| 8. Dial | PHONE | "Dial four two five..." |
| 9. Show | PHONE | "Show Max Chickering." |
| 10. Battery | STATUS | "What's the battery level?" |
| 11. Date | STATUS | "What is the current date?" |
| 12. Flight Mode | STATUS | "Set flight mode off." |
| 13. Missed Calls | STATUS | "What calls did I miss?" |
| 14. Ringer | STATUS | "Set ringer to soft." |
| 15. Set Profile | STATUS | "Set profile to Max." |
| 16. Signal | STATUS | "What's my signal strength?" |
| 17. Time | STATUS | "What time is it?" |

FIG. 2

| | |
|---|---|
| Device-Related | |
| IsCalendarEnabled, AreContactsEstablished, IsMediaEnabled, IsPhoneEnabled, IsStartMenuEnabled, UserHardware {Pocket PC, Smart Phone}, NumContacts, NumAlbums, NumArtists, NumGenres, NumStartMenus | |
| Time-Related | |
| DayofWeek, IsWeekend, TimeOfDay Morning, Afternoon, Evening, IsWorkingHour, Month | |
| Predicate-Related | |
| LastRule, MostFreqRule, FractOfMostFreqRuleToRest | |
| Contact-Specific | |
| UniformMass {Contact Perplexity}, NumFilledFields, HasPrefix, HasFirstName, HasMiddleName, HasLastName, HasSuffix, HasHome, HasCell, HasWork, HasCompanyName, IsSameAsLastItem, LastCallLocation {Home, Work, Mobile, ...} | |
| Periodic (Referring to both Predicates and Contact Items) | |
| Is MostFreqWithinDay, IsMostFreqWithinHour, IsMostFreqWithin30Min, DurSinceLastInstance, FractOfDayMatches, FractOfHourMatches, FractToRest, FractWithinHour, FractWithin30Min, FractOfMostFreqDayMatches, FractOfMostFreqHourMatches, NumInstancesSoFar, TimeMatchesDayOfLast, TimeMatchesHourOfLast | |

FIG. 5

USING PREDICTIVE USER MODELS FOR LANGUAGE MODELING ON A PERSONAL DEVICE WITH USER BEHAVIOR MODELS BASED ON STATISTICAL MODELING

CROSS REFERENCE TO RELATED APPLICATION(S)

This application is related to co-pending and commonly assigned U.S. application Ser. No. 11/378,202 filed on Mar. 17, 2006 and entitled USING GENERIC PREDICTIVE MODELS FOR SLOT VALUES IN LANGUAGE MODELING, the entirety of which is incorporated herein by reference.

BACKGROUND

Since the beginning of spoken language understanding research in the 1970s, people have dreamed of communicating with all kinds of devices and appliances using speech recognition. Of the many types of interaction that speech recognition affords, command and control (C&C) is perhaps the simplest, both in terms of the interaction model and the required technology. With regard to the interaction model, C&C allows users to interact with a system by simply speaking commands or asking questions restricted to a fixed grammar containing pre-defined phrases.

While C&C interaction has been commonplace in telephony and accessibility systems for many years, only recently have mobile devices had the memory and processing capacity to support not only speech recognition, but a whole range of multimedia functionalities that could be controlled by speech. Indeed, C&C speech products for voice dialing and controlling media have successfully reached the consumer market.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A system and method for prediction of a user goal for command/control of a personal device (e.g., mobile phone) is provided. The system employs statistical model(s) that can predict a command based, at least in part, on past user behavior (e.g., probability distribution over a set of predicates, and/or arguments). For example, if a particular user calls a spouse at the end of every workday, the predictive model can be adapted to weight that spouse more than other contacts during that time. Further, the system can be employed with a speech recognition component to facilitate language modeling for predicting the user goal.

The system includes predictive user model(s) that receive a user input (e.g., spoken command) and employ statistical modeling to determine the likely command without regard to the actual content of the input (e.g., utterance). The system further includes a user data store that stores information (e.g., features) regarding a particular user. The predictive user model can include, for example, models for predicting the next predicate (predicate model), and the next argument of the predicate (argument model).

In particular, the system employs features for predicting the next user goal which can be stored in the user data store. Features can capture personal idiosyncrasies and/or systematic patterns of usage. For examples, device-related, time-related, predicate-related, contact-specific and/or periodic features can be stored and employed by the predictive models.

Optionally, the predicate model and/or the argument model (e.g., contact model) can benefit from operating level information such as what applications are currently running, and application-level information, such as how many phone calls, emails and text messages had been received from particular contact items. This information can likewise be stored in the user data store for use by the system.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features of the claimed subject matter may become apparent from the following detailed description when considered in conjunction with the drawings.

BRIEF DESCRIPTION OF THE DRAWINGS

FIG. 2 is a table listing exemplary predicate functions by category.

FIG. 5 is a table illustrating different types of exemplary features used for predicting the next user goal.

DETAILED DESCRIPTION

Figure 1:
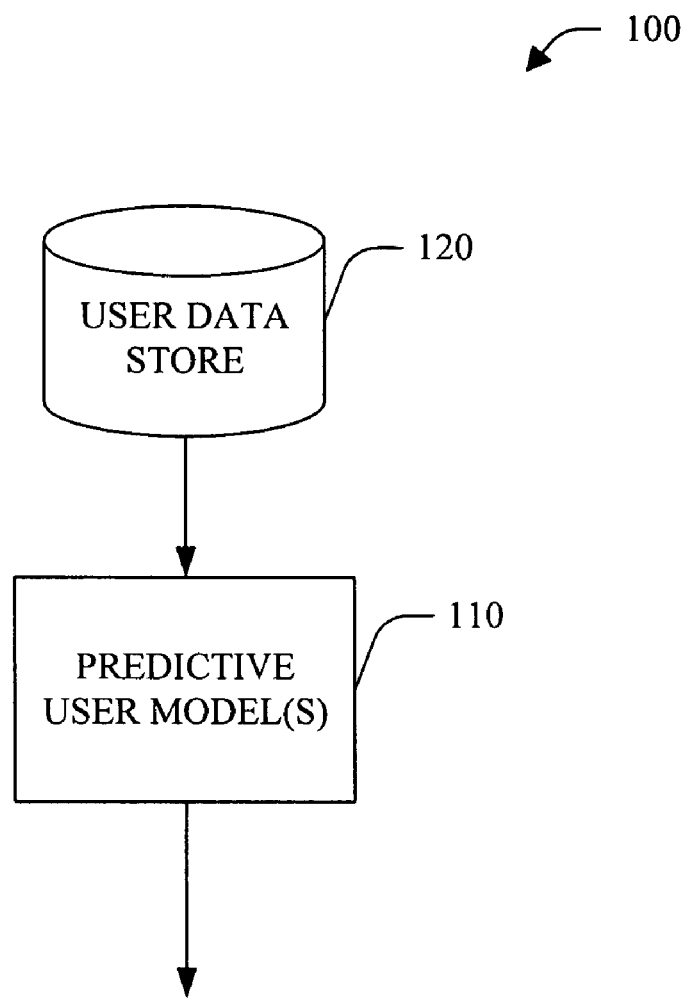
FIG. 1 is a block diagram of a system for prediction of a user goal for command/control of a personal device.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

Additionally, "personal device" refers to a device which can be personalized for an individual user of the device. Pride of ownership is evident in the way users personalize their devices through backgrounds, skins, ring tones, etc. People generally tend to be creatures of habit, so individual users oftentimes display systematic patterns of usage for their personal devices. Personal device can include, for example, a desktop computer system, a notebook computer system, a personal digital assistant, a media player, a mobile phone, a smart phone, a remote control and the like.

Referring to FIG. 1, a system for prediction of a user goal for command/control of a personal device 100 is illustrated. The system 100 employs statistical model(s) that can predict a command based, at least in part, on past user behavior. The system 100 can improve performance of command and control (C&C) speech recognition, as discussed greater detail below. For example, if a particular user calls a spouse at the end of every workday, the model can be adapted to weight that spouse more than other contacts during that time.

The system 100 can be employed in a mobile platform in which advantages of speech over other input modalities can be exploited as speech facilitates easier access to information through description rather than deictic reference, and acts as an "ambient medium" that allows users to do other things at the same time, instead of requiring more focused attention. These advantages help explain why voice dialing on mobile devices is so compelling. Perusing a large database of contacts and selecting an item of interest is not only inherently more difficult than simply describing the item desired (which people ordinarily know by heart), but it is orders of magnitude worse with confined input or limited screen real estate. Add to that the typical user scenario of divided attention and multitasking, where hands and eyes (e.g., referential devices) may be busy, and speech clearly dominates as the preferred modality. Further, the speech modality is scalable for use on mobile devices in contrast to visual or manual modalities.

The system 100 includes predictive user model(s) 110 that receive a user input (e.g., spoken command) and employ statistical modeling to determine the likely command without regard to the actual content of the input (e.g., utterance). The system 100 further includes a user data store 120 that stores information regarding a particular user.

User Model(s) 110

For purposes of explanation, a commercial mobile device C&C speech application domain will be discussed. However, those skilled in the art will recognize that the system 100 can be employed with any suitable C&C domain and all such domains are intended to be encompassed by the hereto appended claims.

Modeling the Domain

In this example, the domain encompasses the functionality of a commercial C&C speech application for mobile devices. With the exemplary C&C speech application, users can look up contacts, place phone calls, get calendar information, get device status information, control media and launch applications.

Because statistical models define probability distributions over random variables, the first step is to define the random variables corresponding to the domain. To simplify presentation, the following syntactic conventions can be adopted. A random variable is denoted by an upper-case token (e.g., A, Π) and a state or value of that variable by the same token in lower case (e.g., a, π). Sets of variables can be denoted with bold-face capitalized tokens (e.g., A, Π) and corresponding sets of values by bold-face lower case tokens (e.g., a, π).

Importantly, the statistical user model(s) 110 define probability distributions over the intent or goal of the next user command in the application. For example, one goal might be to check the date. In command-and-control, the goal often maps directly to the intended command, though those skilled in the art will recognize that this is not a necessary condition. The application allows the user to express this goal in a number of ways, such as "What is the current date?" and "What day is it today?" The user model(s) 110 do not distinguish between the wordings of the same goal.

For modeling purposes, it is convenient to decompose each user goal into two distinct parts. In other applications, this decomposition may result in multiple parts, each of which can have a statistical model associated with it. In this example, the first part of the user goal is defined by one of 17 different predicate functions (or predicates for short) that the application supports at the start of a C&C interaction. Referring briefly to FIG. 2, a table 200 lists the predicate functions by category along with example commands. The second part of the user goal is the (possibly constant) predicate argument. Some predicates, such as Call, take arguments based on content present on the device, such as a contact list. For all other predicates, the argument is constant and the predicate itself defines a goal.

Figure 3:
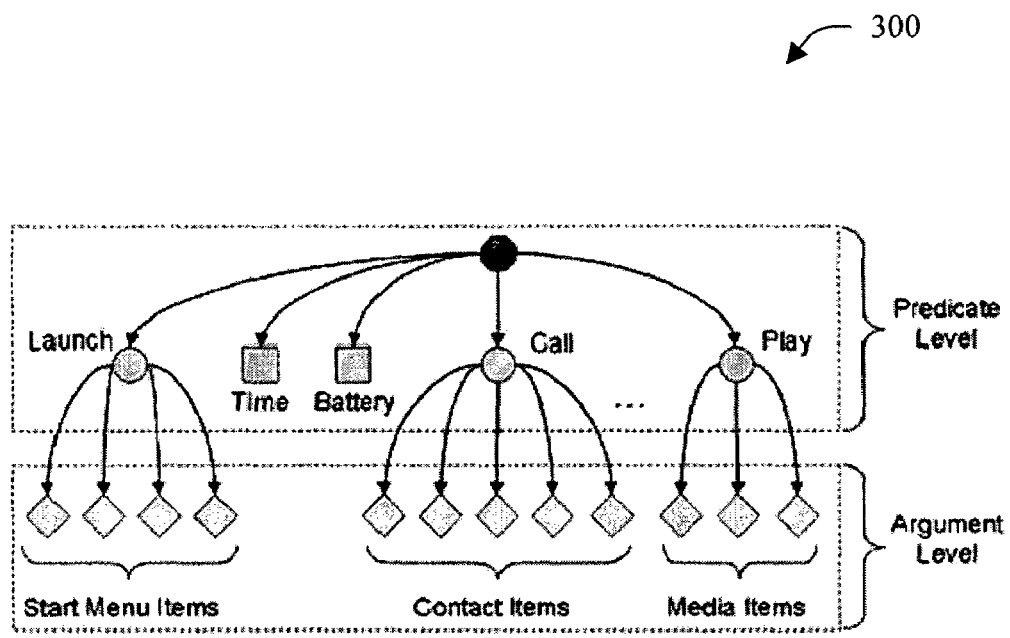
FIG. 3 is a tree illustrating decomposition of several user goals in an exemplary domain.

Turning to FIG. 3, a tree 300 illustrated decomposition of several user goals in this exemplary domain. The children of the root node (circles and squares) correspond to predicates, and the children of each predicate (diamonds) correspond to possible argument values. In this exemplary C&C speech application, the argument values include start menu items for the Launch predicate, contact items for the Call and Show predicates, and media items for the Play predicate. For leaf-node predicates (squares), the argument is constant, such as the Battery predicate. Note that the set of all user goals corresponds to the set of leaves in the tree 300.

More formally, let Π denote the random variable whose values are the 17 different predicates available at the start of an interaction. For any predicate π, let $A_\pi$ denote the random variable whose values are the possible argument values for predicate π; for a predicate π with a constant argument, $A_\pi$ is defined to be the constant zero. For example, if π is the Launch predicate, then $A_\pi$ is a variable whose values correspond to the set of start menu items installed on the mobile device that can be launched using C&C. If π is the Time predicate, then $A_\pi$ is a constant equal to zero.

Continuing, let G denote the random variable corresponding to the next user goal. <predicate, argument> pairs can be used to denote the values of G. For example, to denote the user goal, g<Launch, Application$_1$>, of launching Application$_1$:

$$g\text{<Launch,Application}_1\text{>}=\{\Pi=\pi_{Launch}, a_{Launch=Application1}\}.$$

Similarly, to denote the user goal, g<Time> of checking the time:

$$g\text{<Time>}=\{\Pi=\pi_{Time}, a_{Time}=0\}.$$

As previously described, all user goals correspond to leaves in the tree shown in FIG. 3. By denoting each value g as a pair, each leaf is described by the corresponding path from the root node to the leaf. Further, for any value g of the random variable G, π(g) and a(g) can be used to denote the individual predicate and argument value, respectively, of the pair.

Continuing with this example, the user model 110 uses a number of feature variables to predict the next user goal G, as described in greater detail below. For modeling purposes, F is used to denote the set of feature variables that are able to be observed when G is predicted. Conditioning the next user goal on observed feature variables, the model 110 defines the posterior probability over G as follows:

$$p(G=g|F=f)=p(\Pi=\pi(g)|F=f) \times p(A_{\pi(g)}=a(g)|\Pi=\pi(g), F=f) \quad \text{Eq. (1)}$$

The first term in the right-hand side of Equation 1 can be referred to as the predicate model, and the second term in the right-hand side of Equation 1 can be referred to as the argument model. Note that the argument model is a function of the predicate. Also note that when the argument variable $A_{\pi(g)}$ for a goal g is constant, the argument model is simply defined to be unity.

Model Selection

Those skilled in the art will recognize that any suitable model can be employed that generates a distribution can be employed with the claimed subject matter. In one example, decision trees were chosen for the conditional models, and naïve-Bayes models for the generative models. In a naïve-Bayes model for a target T and set of features F, the joint distribution p(T, F) is represented as $p(T)\Pi_{F_i \in F} p(F_i|T)$. This model makes the strong assumption that all the features are conditionally independent given the target.

In this example, the choice was partly motivated by the need to make sure that the learned models could be quickly and easily updated on a mobile device with a very small memory footprint. Conditional models can offer better classification accuracy for many domains, but naïve-Bayes may be better suited for online personalization because conditionally independent features often have less parameters to update for rapid tuning.

Continuing with this example, for building both conditional and generative models, the WinMine toolkit was used, which learns Bayesian networks employing decision trees to encode local conditional distributions. Splits in decision trees are made through greedy search guided by a Bayesian scoring function. For discrete variables, multinomial distributions in the leaves of the trees were learned. For continuous variables, Gaussian distributions in the leaves of the trees were learned.

Figure 4:
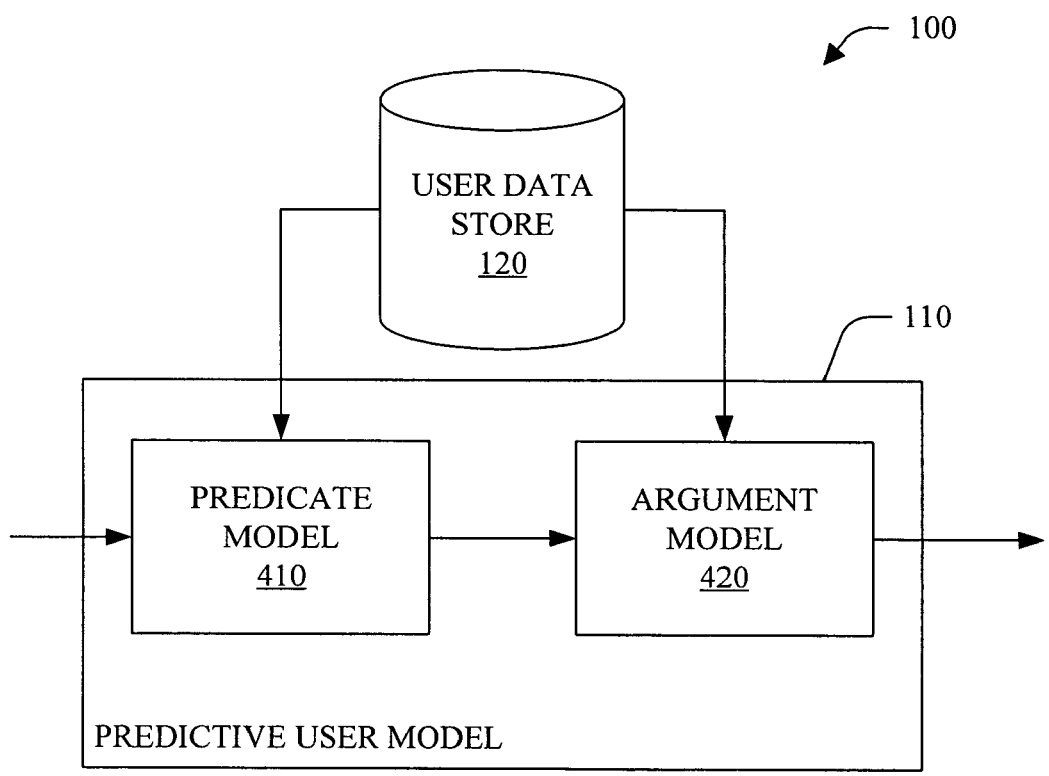
FIG. 4 is a block diagram of a system for prediction of a user goal for command/control of a personal device.

Referring briefly to FIG. 4, as noted above, the predicted variable G is the next user goal which can be decomposed into models for predicting the next predicate (predicate model 410), and the next argument of the predicate (argument model 420). While Equation 1 applies to all predicates and arguments in the C&C application, for purposes of brevity, only argument models for the contact items will be described herein. However, those skilled in the art will recognize that the argument model can be employed for any suitable argument types and the appended claims are intended to encompass all such argument types. Further, for purposes of discussion, the term "contact model" refers to an argument model specific to the contact items. In one example, contact-related commands constituted the majority of all commands made by users.

Feature Engineering

As noted previously, the system 100 receives a user input (e.g., spoken command) and employs statistical modeling to determine the likely command without regard to the actual content of the input (e.g., utterance). In particular, the system 100 employs features for predicting the next user goal which can be stored in the user data store 120. "Feature" refers to any non-acoustic quality, for example, device-related, time-related, predicate-related, contact-specific and/or periodic.

Due, at least in part, to the intuition that the personal nature of personal devices such as mobile devices lends itself to statistical modeling. So, if a user calls a spouse at the end of every workday, or if a user listens to music every morning, it is desirous to generate features to capture that information.

In one example, in order to exploit this intuition, whereas it seemed reasonable to assume that individual users might display personal idiosyncrasies or systematic patterns of usage for the C&C application, whether or not these patterns might be consistent across all users remained to be seen empirically. In order to assess if systematic patterns of usage prevailed in the general population of users, the features, in one example, were engineered to capture these patterns such that the features were generalized across all users. For example, suppose one user calls a relative every Saturday while another user calls every Wednesday. If the system 100 only kept track of the day of the week as our feature, the system 100 could not pick out that pattern. Thus, in this example, what was needed is a periodic feature such as how often calls made to particular contact occur on the same day of the week.

Turning to FIG. 5, a table 500 which illustrates the different types of features used for predicting the next user goal in one example. For the contact model, all the features were used. For the general predicate model, contact-specific features were excluded. Note that with the periodic features, an item could be a particular predicate (e.g., Battery) or contact item (e.g., John Doe). Hence, in this example, for the predicate model 410, which defined a distribution over 17 possible predicates, periodic features were created for each of the predicates. Because there were 14 generic periodic features, well over two hundred periodic features for the predicate model 410 were employed. The information stored in the user data store 120 can include time-stamp information for spoken commands and/or pieces of device data associated with the features illustrated in FIG. 5.

Optionally, the predicate model 410 and/or the argument model 420 (e.g., contact model) can benefit from operating level information such as what applications are currently running, and application-level information, such as how many phone calls, emails and text messages had been received from particular contact items. This information can likewise be stored in the user data store 120 for use by the system 100.

Contact-Argument Model

As discussed above, the perplexity of the domain for the predicate model 410 is relatively small. A more challenging prediction problem, due to the fact that users in one sample set had anywhere from 5 to over 2000 contacts on their mobile devices, is to determine which contact a user is likely to request.

Conditional and/or generative models can be built that predict the intended contact item of the Call or Show predicates. Models for the second term of Equation 1:

$$p(A_{\pi(g)} = a(g) | \Pi = \pi(g), F = f) \quad \text{Eq. (1)}$$

restricted to those situations in which π(g) is either a Call or Show predicate are considered. The notation can be simplified by using the variable C for $A_{\pi(g)}$. Furthermore, leaving implicit the conditioning on the predicate Π=π(g):

$$p(C = c(g) | F = f) \quad \text{Eq. (2)}$$

where c(g) is the contact associated with the user goal.

In prior research, statistical models maintained an explicit distribution p(C=c(g)) (without input features) over the contact list of the user. Here, an alternative approach was taken where for any set of contacts, a number of binary variables were created that indicated whether or not each specific contact was the intended c(g). $B_{C=c}$ is used to denote the binary variable corresponding to C=c. For each contact, a set of input features was created that can be used to predict the corresponding binary variable. These input features are generic properties of the contact that are "instantiated" based on properties of the contact. These input features can be called "contact-specific features". Exemplary contact-specific features are included in table 500 of FIG. 5. These contact-specific features can be stored in the user data store 120.

As an example, suppose there are three contacts in a user's contact list: Joe, Steve and Mary. In this case, there are three binary variables $B_{c(g)=Joe}$, $B_{c(g)=Steve}$ and $B_{c(g)=Mary}$, where $B_{c(g)=Joe}$ is defined to be true if Joe is the intended contact of the next goal (and similarly for the other two). To predict $B_{c(g)=Joe}$, the argument model 420 instantiates the contact-specific feature HasCell for Joe, which indicates whether or not there is a cell phone number for Joe. When predicting $B_{c(g)=Mary}$, the corresponding value for the HasCell feature instead indicates whether or not there is a cell phone number for Mary.

In this approach to building a contact-argument model, a single model that predicts every binary B variable is learned using as training data all the contacts for every user. In other words, a single generic contact model is learned that applies to every specific contact in any user's list. Using f(c) to denote the contact-specific features corresponding to contact c, the argument model 420 represents, for any contact c, $$p(B_{C=c} = \text{true} | f(c)).$$

To use this model to construct p(C=c(g)|F=f), the values of $p(B_{C=c} = \text{true} | f(c))$ are normalized for all c:

$$p(C = c(g) | F = f) = \frac{p(B_{C=c(g)} = \text{true} | f(c(g)))}{\sum_{c'} p(B_{C=c'} = \text{true} | f(c'))} \quad \text{Eq. (3)}$$

In one example, this model can be applied to all the contacts in a contact list. In another example, the argument model 420 is restricted to those seen contact item(s) had been shown or called at least once so far—and using a uniform distribution for the remaining unseen items—the performance of the argument model 420 can be improved. To describe this slight modification to the argument model 420, s can be used for the set of seen contacts. The probability p(seen) that the next contact will be a member of s can then be modeled, yielding the argument model 420 (contact model):

$$p(C = c(g) | F = f) = \begin{cases} p(\text{seen}) \cdot \frac{p(B_{C=c(g)} = \text{true} | f(c(g)))}{\sum_{c'} p(B_{C=c'} = \text{true} | f(c'))} & \text{if} \\ c(g) \in s(1 - p(\text{seen})) \cdot \frac{1}{\sum_{c' \notin S} 1} & \text{otherwise} \end{cases} \quad \text{Eq. (4)}$$

To model p(seen), update the following fraction can be updated:

$$\frac{\sum_{c \in s} k(c) + 1}{N + 2} \quad \text{Eq. (5)}$$

where the function k(c) denotes the number of repeat requests for any seen contact so far, and N denotes the total number of requests made so far. Optionally, for smoothing, 1 was added to the numerator and 2 was added to the denominator.

Figure 6:
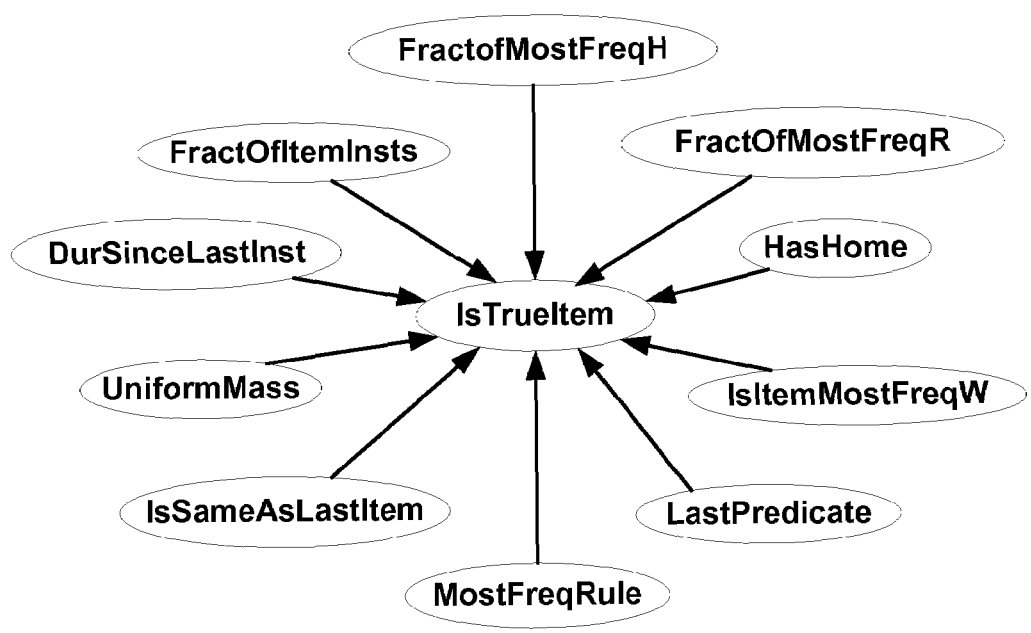
FIG. 6 is a diagram of a learned decision tree of a conditional model.
Figure 7:
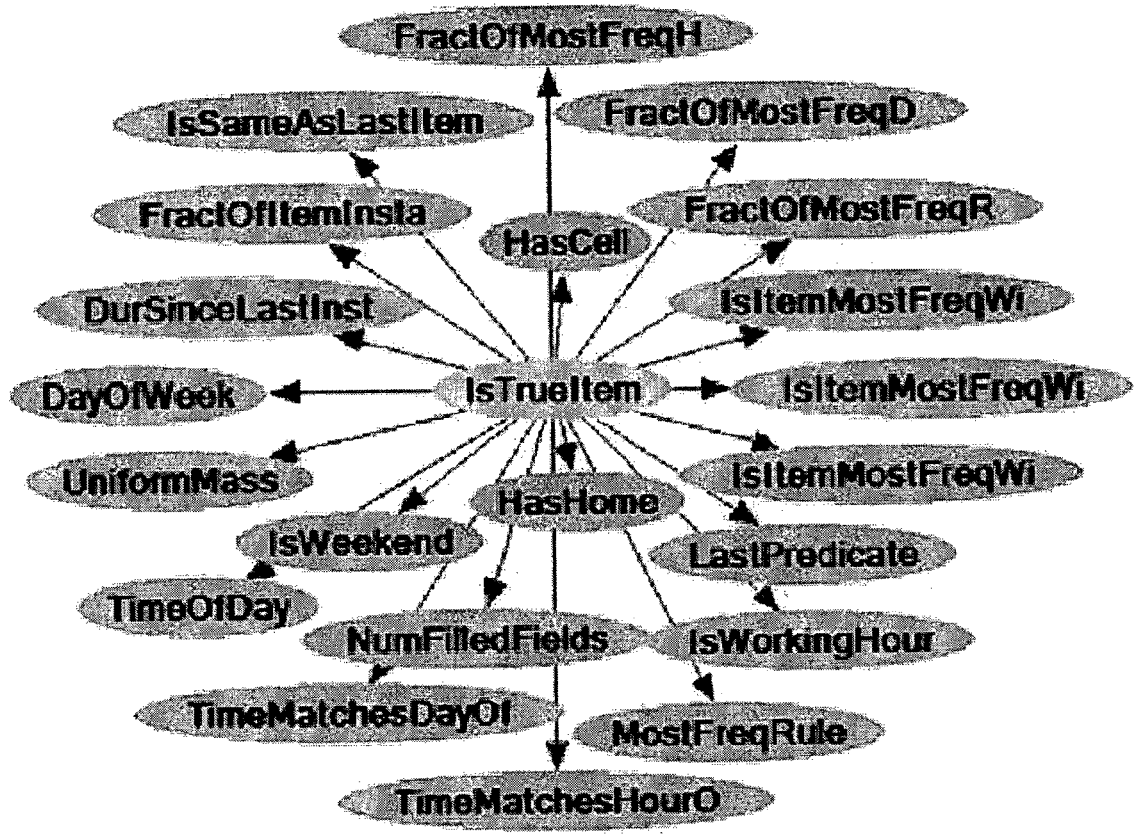
FIG. 7 is a diagram of a learned naïve-Bayes graphical model.

Similar to the predicate model 410, in one example, both a decision tree and a naïve-Bayes model were learned for $p(B_{C=c(g)} = \text{true} | f(c(g)))$. Referring briefly to FIGS. 6 and 7, a learned decision tree 600 of the conditional model and learned naïve-Bayes graphical model 700 are illustrated. The tree 600 displays the features that were split on in the decision tree within the conditional model. Not surprisingly, the naïve-Bayes graphical model 700 contains the same 10 features as the decision tree 600, but also 11 more. It is interesting that the majority of these additional features are time-related or periodic. Both the decision tree 600 and naïve-Bayes model 700 include the last predicate as a feature, which was the only feature selected in the predicate model.

Examining the conditional distribution for the decision tree 600 reveals a number of intuitive statistical patterns. For example, one path through the tree 600 stated that if a user is calling a contact for which a home number is available, and the last time that contact was called was less than 30 seconds ago, then it is 90% certain that the user is trying to call the contact again. In short, users try repeatedly to reach people they know.

Language Modeling

Although the user models 110 for predicting the next predicate (predicate model 410) and contact (argument model 420) achieved impressive classification accuracies and perplexity reductions, the overall goal is to improve C&C speech recognition. Thus, the user models 110 can be applied for language modeling.

Figure 8:
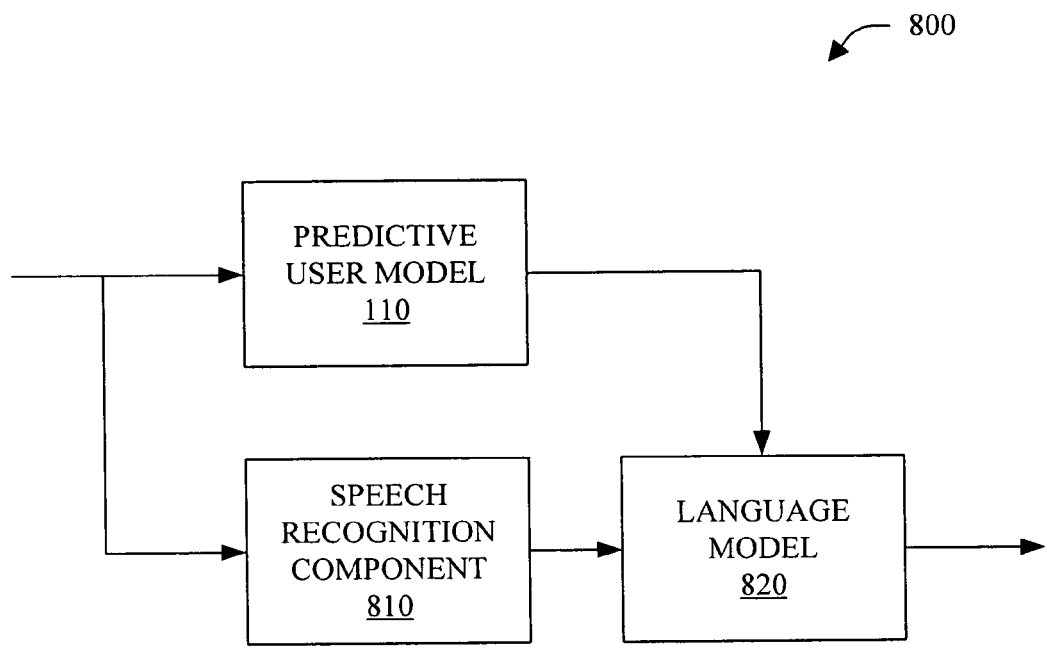
FIG. 8 is a block diagram of a language model system for prediction of a user goal for command/control of a personal device.

Referring to FIG. 8, a language model system 800 for prediction of a user goal for command/control of a personal device is illustrated. Language modeling for speech recognition is typically focused on obtaining a distribution over the possible words. In a C&C setting, however, what matters most is task completion. The task-completion goal is to identify the correct value of the goal variable G given an acoustic signal η. Using a Bayesian framework, the goal is to identify the value g of variable G that maximizes:

$$p(g | \eta, f) = \alpha \cdot p(\eta | g) p(g | f) \quad \text{Eq. (7)}$$

where α is a normalization constant, and it is assumed that the acoustic signal is independent of the input features once the user goal is known. Using a speech recognition component 810 (e.g., Microsoft Speech API (SAPI)), which does not use the input features discussed above, the posterior probability distribution $p_{Uniform}(g|\eta)$ can be abstracted under the (not necessarily appropriate) assumption that every value g is equally likely a priori:

$$p_{Uniform}(g|\eta) = \alpha' \cdot p(\eta|g) \qquad \text{Eq. (8)}$$

where $\alpha'$ is another normalization constant. From Equations 7 and 8, a language model component 820 can obtain the posterior of interest by simply multiplying $p_{Uniform}$ from the speech recognition component 810 (e.g., SAPI) by the output of the predictive user model 110 and then renormalizing:

$$p(g|\eta, f) \propto p_{Uniform}(g|\eta) \cdot p(g|f) \qquad \text{Eq. (9)}$$

Online Personalization

In evaluating the predictive user model(s) 110 applied to language modeling, in the experiment outlined above, without any online adaptation of model parameters, a 21% reduction in error rate relative to the performance of the current application was achieved. Optionally, model parameters of the predictive user model(s) 110 can be personalized based on individual user data. Thus, idiosyncratic patterns of usage can be employed to improve the overall performance.

Adjusting the Learning Rate

As discussed previously, in one example, a decision tree was chosen as the conditional model and a naïve-Bayes model was chosen as the generative model. Significantly, these models can be updated easily in an online fashion. For both the conditional and generative models, local conditional distributions can be encoded as decision trees. The disadvantage of this is that the decision tree is committed to the splits and only the parameters at the leaves of the tree can be updated. Regardless, in updating the parameters in an online fashion, a decision is made as to how to set the learning rate, which defines how quickly model parameters are updated in light of new data.

Let $\beta$ denote the learning rate. As described earlier, multinomial distributions are used in the leaves of the trees for discrete variables; let $\theta$ denote a current probability value from such a distribution within the model. For example, $\theta$ might denote the probability that the next predicate is a call. Using an online-update algorithm, a new estimate for $\theta$ can be obtained, denoted as $\theta'$, as follows:

$$\theta' = (1-\beta) \cdot \theta + \beta \cdot I$$

where $I$ is the indicator function for whether the state corresponding to the parameter occurred or not (e.g., whether or not the next predicate was, indeed, a call).

For continuous variables, where Gaussian distributions were used, the parameters were updated in an analogous manner. The main difference is that in addition to a learning rate, an absolute "weight" was assigned to each data point; a constant absolute weight of one was used in the experiments described herein.

The learning rate can be kept constant, or it can be adjusted over time. In the conducted experiments, $\beta$ was either set to a constant in the range from 0 to 0.25, or the following simple adjustment schedule was used, which is referred to as the cumulative learning rate:

$$\beta = \frac{ESS}{N + ESS}$$

where N is the total number of individual observations seen so far and ESS is the equivalent sample size of the training data. In the conducted experiments, the equivalent sample size was set to one to indicate that the model should treat the old data from which the parameters were trained as if it only had one sample. As N accumulates the learning rate gradually decreases, converging to zero.

It is to be appreciated that the system 100, the predictive user model(s) 110, the user data store 120, the predicate model 410, the argument model 420, the system 800, the speech recognition component 810 and/or the language model 820 can be computer components as that term is defined herein.

Figure 9:
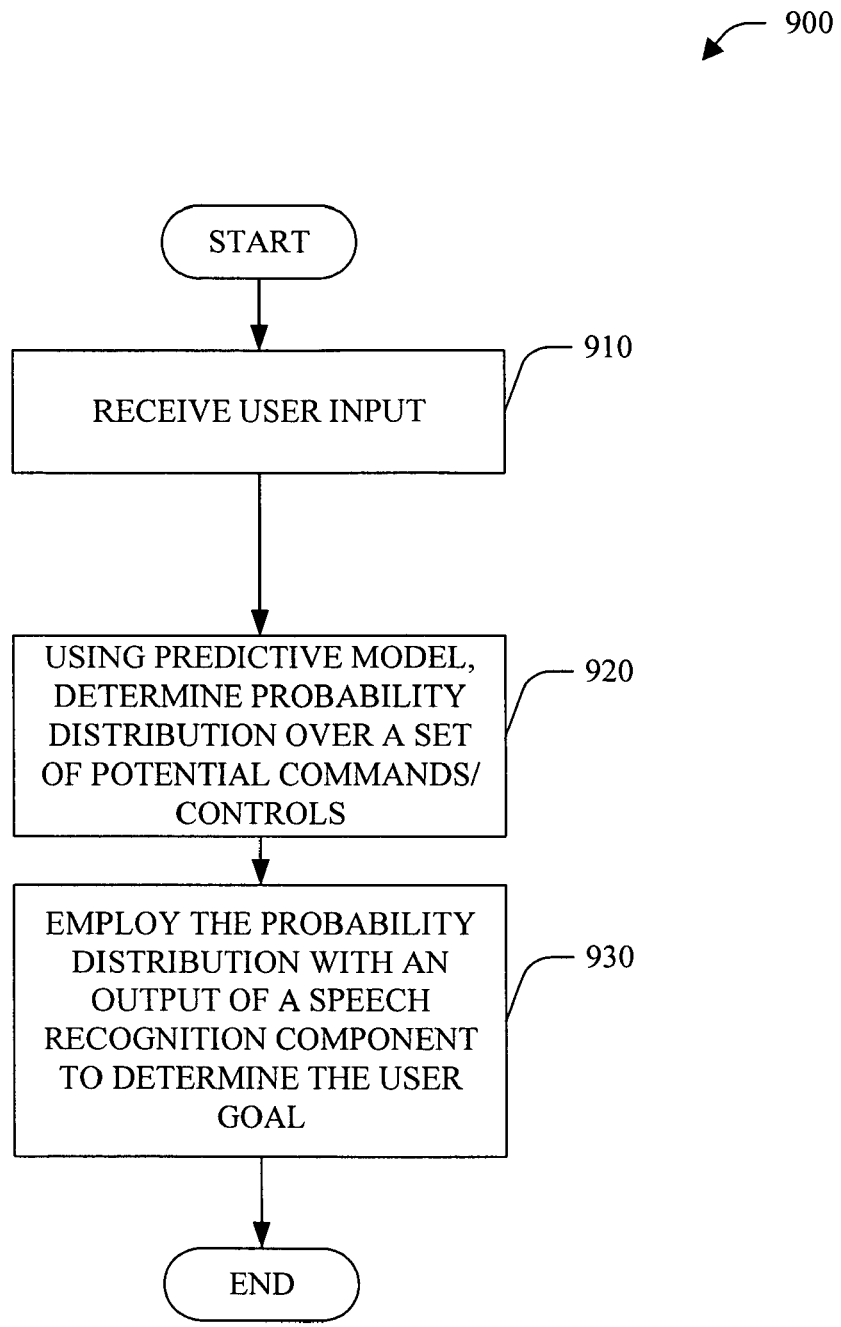
FIG. 9 is a flow chart of a method for prediction of a user goal for command/control of a personal device.
Figure 10:
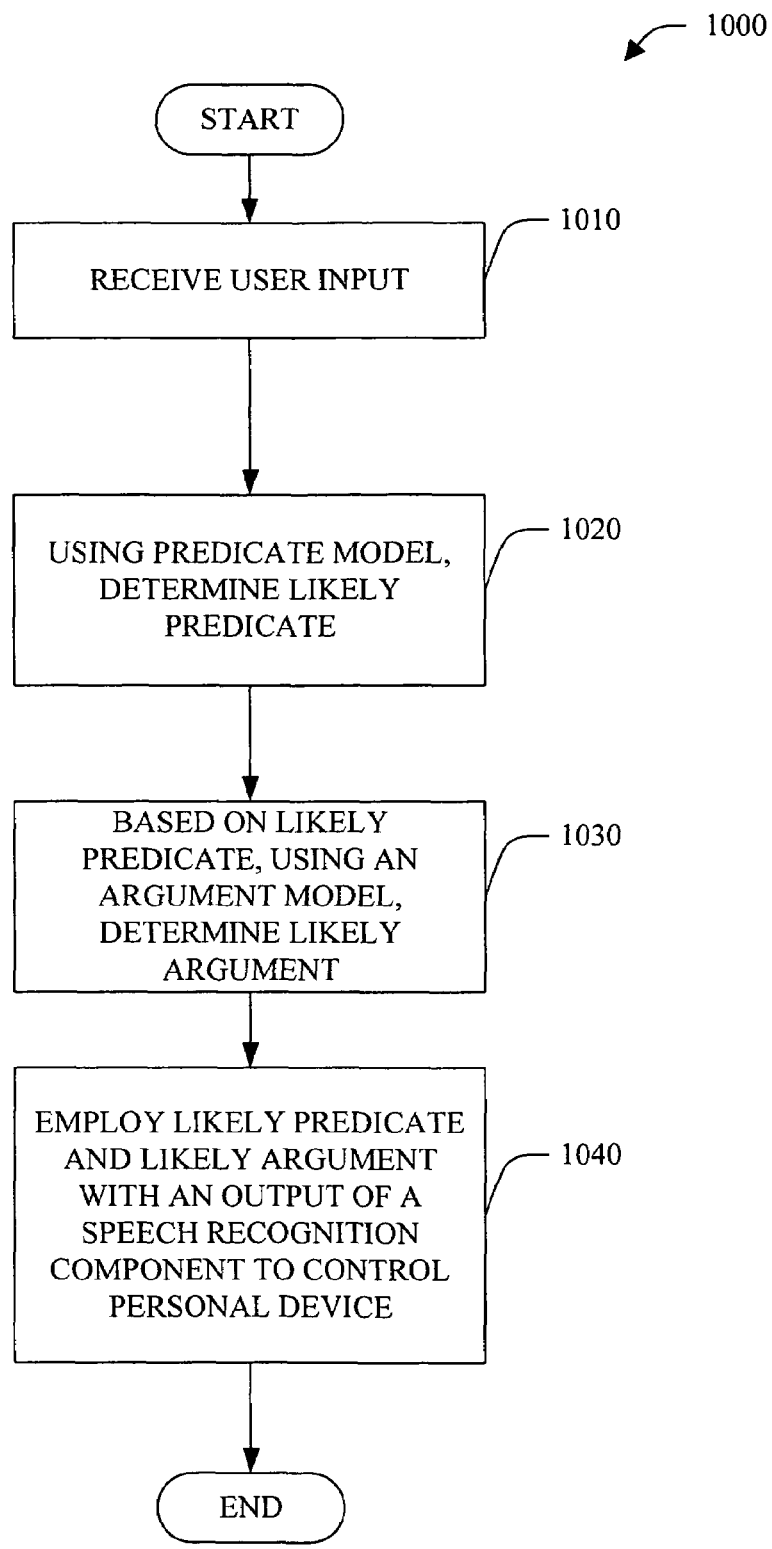
FIG. 10 is a flow chart of a method for prediction of a user goal for command/control of a personal device.
Figure 11:
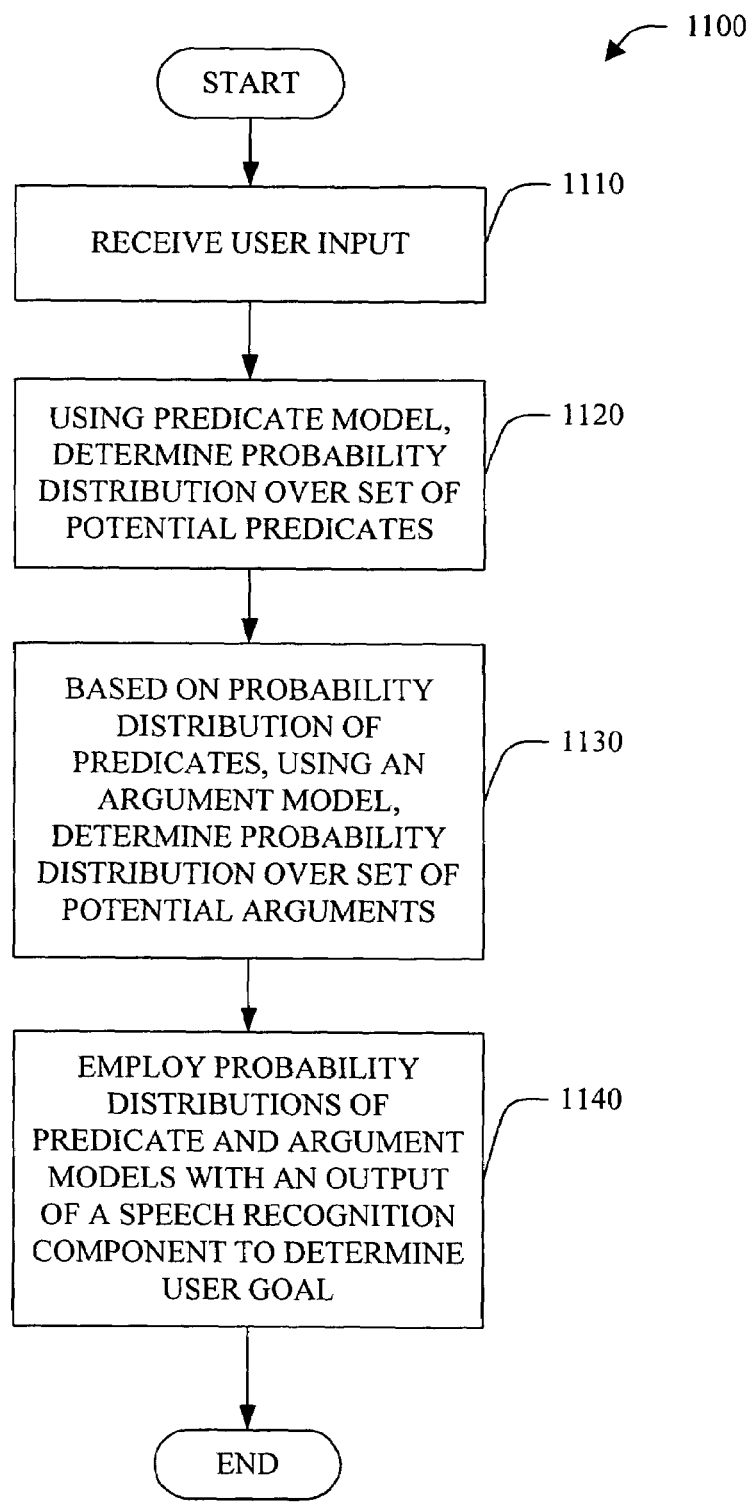
FIG. 11 is a flow chart of a method for prediction of a user goal for command/control of a personal device.

Turning briefly to FIGS. 9-11, methodologies that may be implemented in accordance with the claimed subject matter are illustrated. While, for purposes of simplicity of explanation, the methodologies are shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodologies.

The claimed subject matter may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 9, a method for prediction of a user goal for command/control of a personal device 900 is illustrated. At 910, a user input (e.g., utterance) is received. At 920, a probability distribution over a set of potential commands/controls is determined using a predictive model (e.g., independent of the content of the user input). At 930, the probability distribution is employed with an output of a speech recognition component to determine the user goal.

Turning to FIG. 10, a method for prediction of a user goal for command/control of a personal device 1000 is illustrated. At 1010, a user input (e.g., utterance) is received. At 1020, a predicate model is used to determine a likely predicate.

At 1030, based on the likely predicate, using an argument model, a likely argument (e.g., contact) is determined. At 1040, the determined likely predicate and determined likely argument are employed with an output of a speech recognition component to control the personal device.

Next, referring to FIG. 11, a method for prediction of a user goal for command/control of a personal device 1100 is illustrated. At 1110, a user input is received. At 1120, a predicate model is used to determine a probability distribution of potential predicates is determined.

At 1130, based on the probability distribution of potential predicates, using an argument model, a probability distribution of potential arguments is determined. At 1140, the probability distributions are employed with an output of a speech recognition component determine the user goal.

Figure 12:
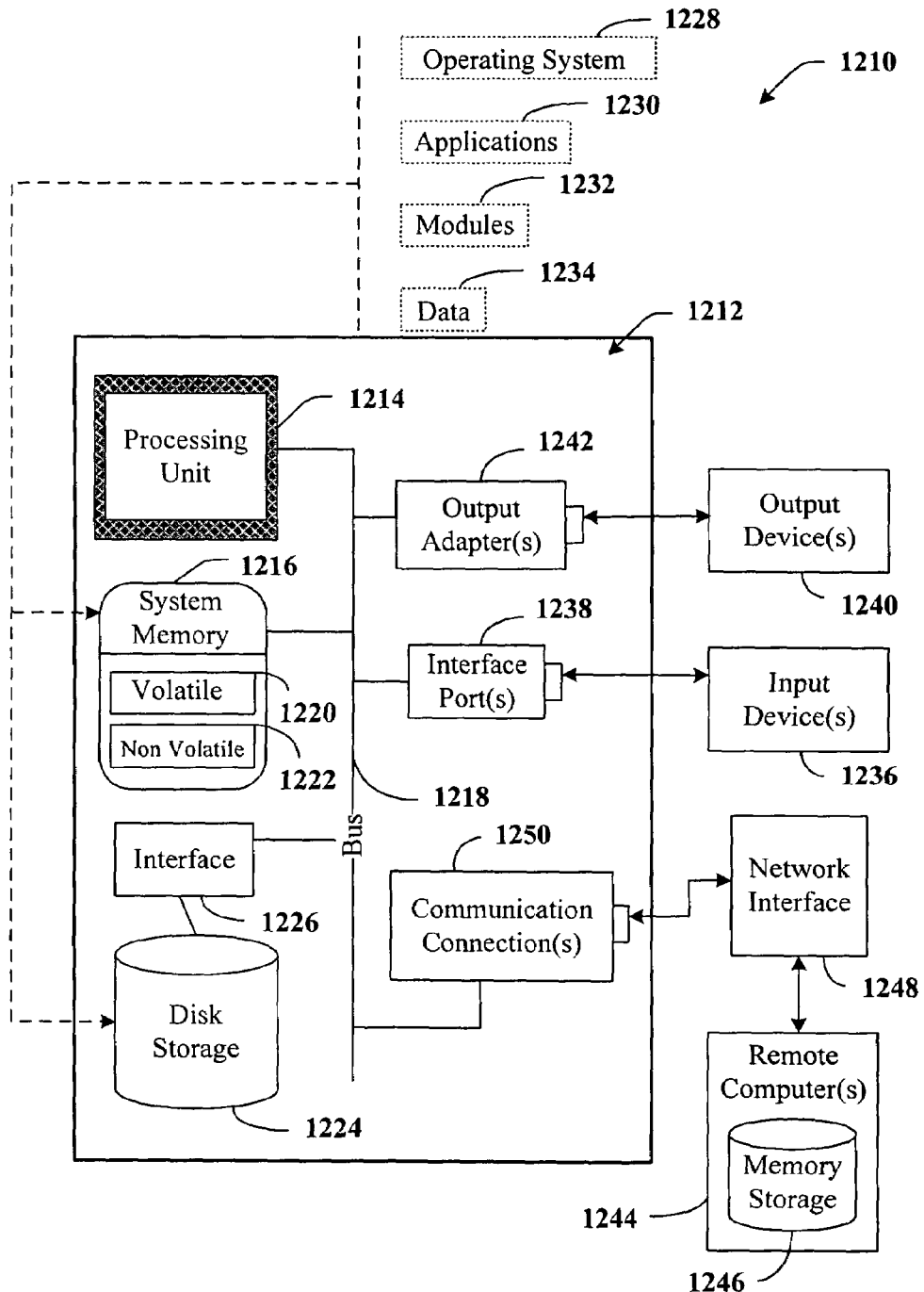
FIG. 12 illustrates an example operating environment.

In order to provide additional context for various aspects of the claimed subject matter, FIG. 12 and the following discussion are intended to provide a brief, general description of a suitable operating environment 1210. While the claimed subject matter is described in the general context of computer-executable instructions, such as program modules, executed by one or more computers or other devices, those skilled in the art will recognize that the claimed subject matter can also be implemented in combination with other program modules and/or as a combination of hardware and software. Generally, however, program modules include routines, programs, objects, components, data structures, etc. that perform particular tasks or implement particular data types. The operating environment 1210 is only one example of a suitable operating environment and is not intended to suggest any limitation as to the scope of use or functionality of the claimed subject matter. Other well known computer systems, environments, and/or configurations that may be suitable for use with the claimed subject matter include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 12, an exemplary environment 1210 includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/nonremovable, volatile/nonvolatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for the prediction of a user goal for command/control of a personal device, comprising:
    a user data store that stores information regarding a particular user's behavior with respect to the personal device;
    a predictive user model that receives a user input and employs statistical modeling of the information stored in the user data store to predict a command/control, based at least in part on a past pattern of behavior by the user, to be automatically performed by the personal device; and
    an execution component that automatically performs the command/control determined according to the predictive user model,
    wherein at least one of a parameter and a structure of the predictive model is updated in an online manner, and
    wherein the online update is performed according to a learning rate ($\beta$), wherein the learning rate is:

$$\beta = \frac{ESS}{N + ESS},$$

wherein N is the total number of individual observations and ESS is an equivalent sample size of training data.

2. The system of claim 1, statistical modeling of the predictive user model is performed without regard to the substantive content of the user input.

3. The system of claim 1, the predictive user model determines a probability distribution over a set of potential commands/controls.

4. The system of claim 1, the predictive user model comprising a predicate model that employs statistical modeling of the information stored in the user data store to predict the command/control.

5. The system of claim 1, the predictive user model comprising an argument model that employs statistical modeling and the information stored in the user data store to determine a likely argument of the command/control.

6. The system of claim 1, the information stored in the user data store comprises a plurality of features associated with the particular user's behavior.

7. The system of claim 6, the features comprising at least one of periodic, contact-specific, predicate-related, time-related and device-related features.

8. The system of claim 1, the predictive model comprises a conditional model.

9. The system of claim 8, the conditional model is a decision tree.

10. The system of claim 1, the predictive model comprises a generative model.

11. The system of claim 10, the predictive model is a naïve-Bayes model.

12. The system of claim 1, the predictive model learned for a general user population.

13. The system of claim 1, the personal device comprising a desktop computer system, a notebook computer system, a personal digital assistant, a media player, a mobile phone, a smart phone and a remote control.

14. A method of controlling a personal communication device, comprising:
    inputting a spoken command to the personal communication device;
    providing a predictive user model to determine, from the spoken command, a likely contact to be called by the personal communication device;
    providing, as a first component of the predictive user model, a predicate model having a plurality of predicate functions supported by an application of the personal communication device,
    providing, as a second component of the predictive user model, an argument model, the argument model being a function of the predicate model and employing statistical modeling and information stored in a personalized user data store to determine a likely contact corresponding to a predicate function, wherein the argument model represents for a contact c: $p(B_{C=c}=\text{true}|f(c))$, wherein $p(B_{C=c}=\text{true}|f(c))$ is normalized for all c via: $p(C=c(g)|F=f)=$ $$\frac{p(B_{C=c(g)} = \text{true} \mid f(c(g)))}{\sum_{c'} p(B_{C=c'} = \text{true} \mid f(c'))},$$

in which F is a set of variables that are observed when G is predicted, G is a random variable corresponding to a next goal, g is a goal, C is $A_{\pi(g)}$, $A_\pi$ is a random variable whose values are possible argument values for predicate $\pi$, $B_{C=c}$ is a binary variable corresponding to C=c, and p is a probability;
    providing a speech recognition component;
    modifying an output of the speech recognition component by an output of the predictive user model to form a modified output;
    providing a language model that determines a contact based on the modified output; and
    calling the contact,
    wherein the information stored in the personalized user data store comprises an identification of: what applications are currently running on the personal communication device and a number of calls, emails and text messages that have been received from a particular contact, wherein a contact is associated with a set of contact-specific features which are used to predict binary variables, wherein the determination of the likely contact is based at least partially on a binary variable being defined as true.

15. The system of claim 8, wherein the conditional model indicates that if a user is trying to call a contact, and the user has made a previous call within a predetermined time interval, it is more likely than not that the user is trying to call the same contact as in the previous call.

16. One or more processor-accessible storage media comprising processor-executable instructions of controlling a personal communication device that include:
    inputting a spoken command to the personal communication device;

providing a predictive user model to determine, from the spoken command, a likely contact to be called by the personal communication device;

providing, as a first component of the predictive user model, a predicate model having a plurality of predicate functions supported by an application of the personal communication device, providing, as a second component of the predictive user model, an argument model, the argument model being a function of the predicate model and employing statistical modeling and information stored in a personalized user data store to determine a likely contact corresponding to a predicate function, wherein the argument model represents for a contact c: $p(B_{C=c}=\text{true}|f(c))$, wherein $p(B_{C=c}=\text{true}|f(c))$ is normalized for all c via: $p(C=c(g)|F=f)=$ $$\frac{p(B_{C=c(g)} = \text{true} \mid f(c(g)))}{\sum_{c'} p(B_{C=c'} = \text{true} \mid f(c'))},$$

in which F is a set of variables that are observed when G is predicted, G is a random variable corresponding to a next goal, g is a goal, C is $A_{\pi(g)}$, $A_\pi$ is a random variable whose values are possible argument values for predicate $\pi$, $B_{C=c}$ is a binary variable corresponding to C=c, and p is a probability;

providing a speech recognition component;

modifying an output of the speech recognition component by an output of the predictive user model to form a modified output;

providing a language model that determines a contact based on the modified output; and calling the contact, wherein the information stored in the personalized user data store comprises an identification of: what applications are currently running on the personal communication device and a number of calls, emails and text messages that have been received from a particular contact, wherein a contact is associated with a set of contact-specific features which are used to predict binary variables, wherein the determination of the likely contact is based at least partially on a binary variable being defined as true.

17. One or more processor-accessible storage media comprising processor-executable instructions of controlling a personal communication device that includes:

a user data store module that stores information regarding a particular user's behavior with respect to the personal device;

a predictive user model that receives a user input and employs statistical modeling of the information stored in the user data store module to predict a command/control, based at least in part on a past pattern of behavior by the user, to be automatically performed by the personal device; and an execution component module that automatically performs the command/control determined according to the predictive user model, wherein at least one of a parameter and a structure of the predictive model is updated in an online manner, and wherein the online update is performed according to a learning rate ($\beta$), wherein the learning rate is:

$$\beta = \frac{ESS}{N + ESS},$$

wherein N is the total number of individual observations and ESS is an equivalent sample size of training data.

18. The one or more processor-accessible storage media of claim 17, wherein statistical modeling of the predictive user model is performed without regard to the substantive content of the user input.

19. The one or more processor-accessible storage media of claim 17, wherein the predictive user model determines a probability distribution over a set of potential commands/controls.

20. The one or more processor-accessible storage media of claim 17, wherein the predictive user model comprising a predicate model that employs statistical modeling of the information stored in the user data store module to predict the command/control.

* * * * *